United States Patent Office 3,295,313
Patented Jan. 3, 1967

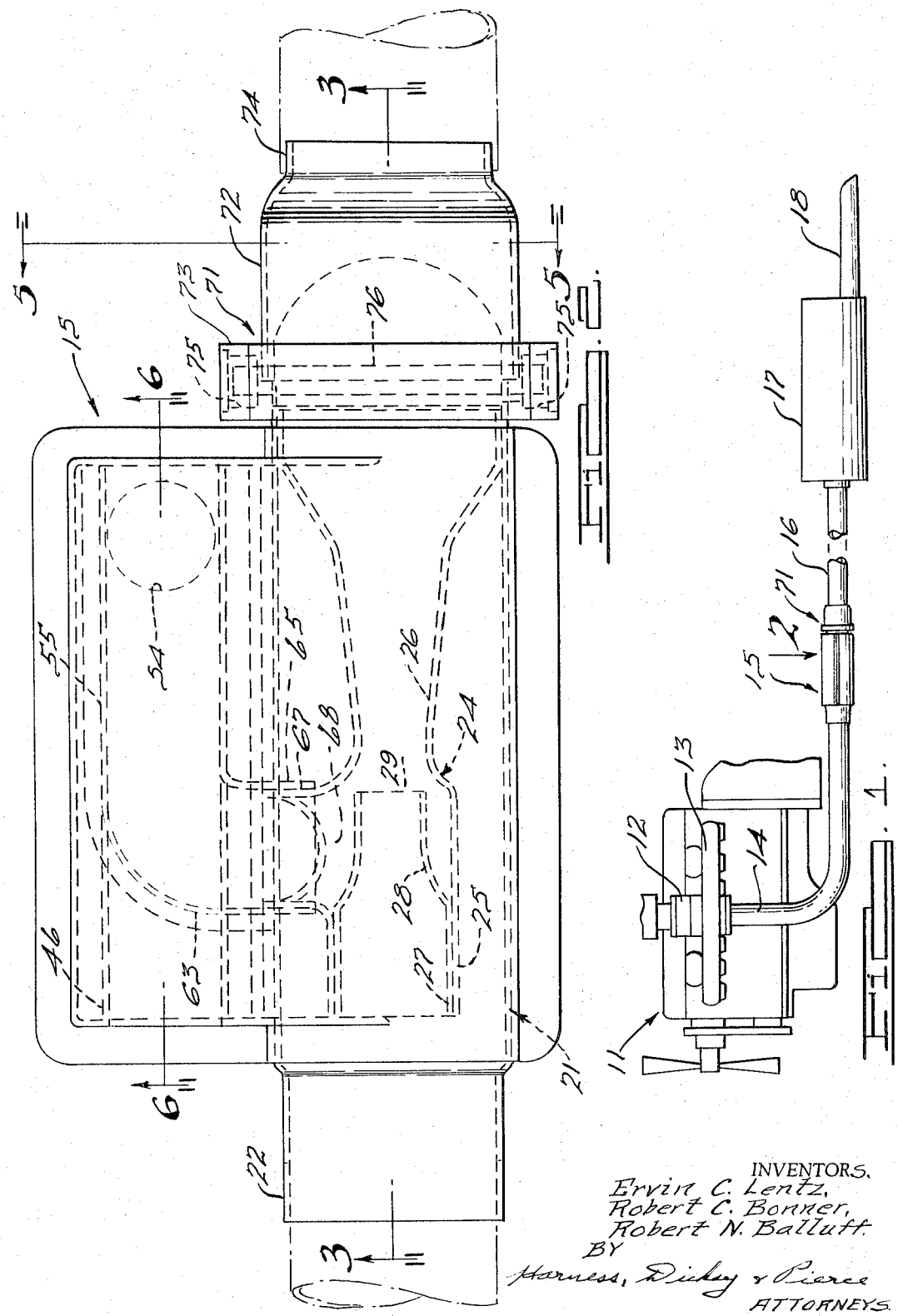

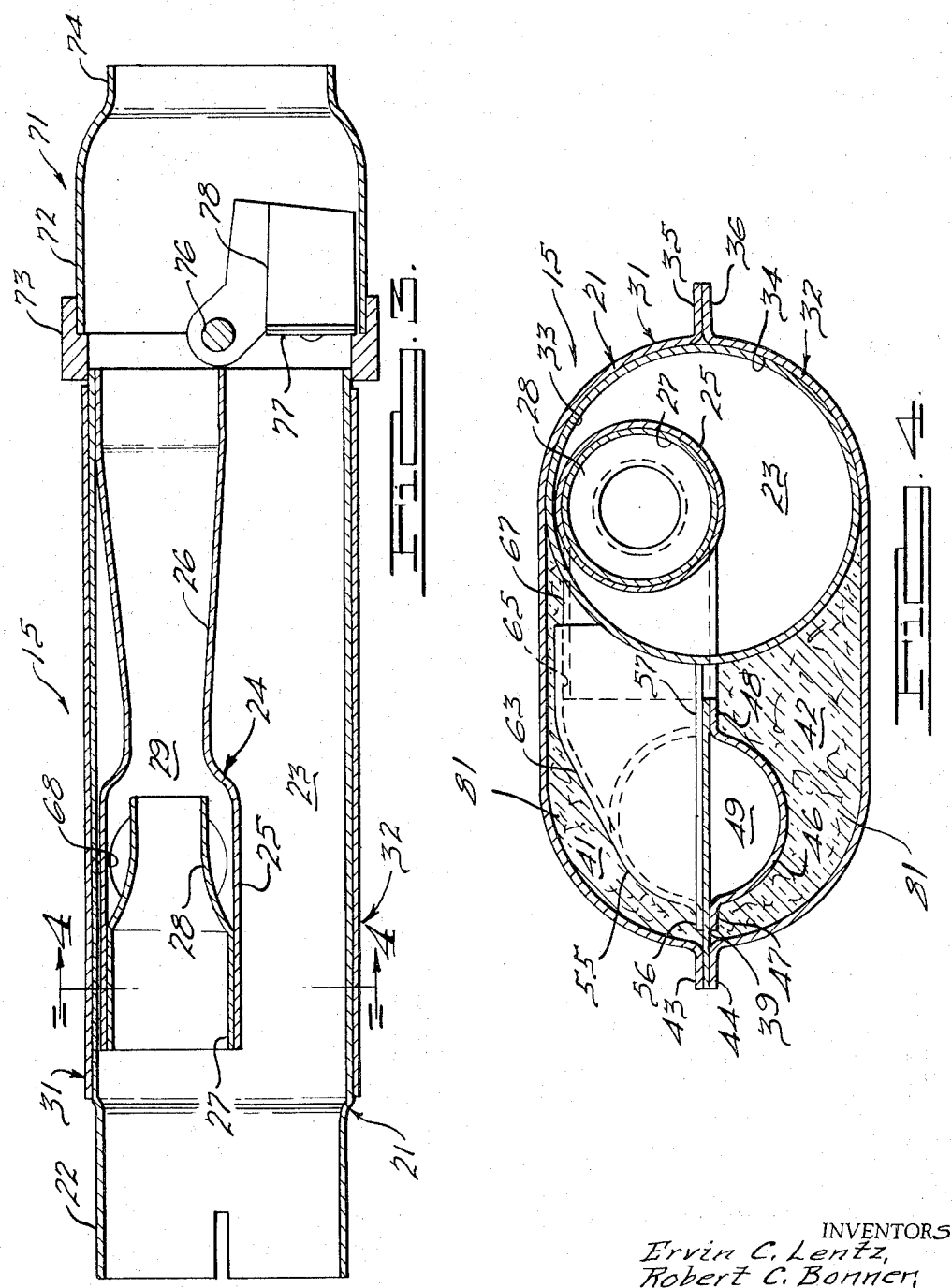

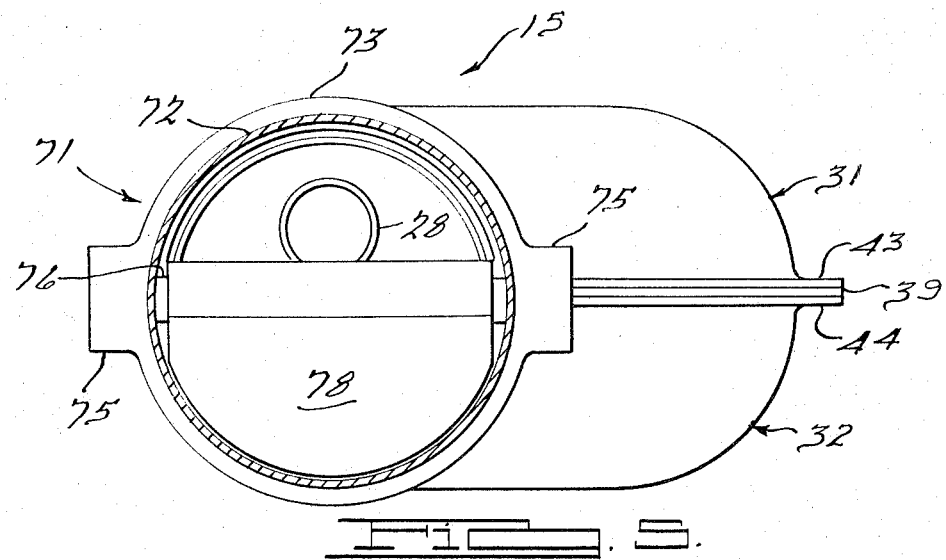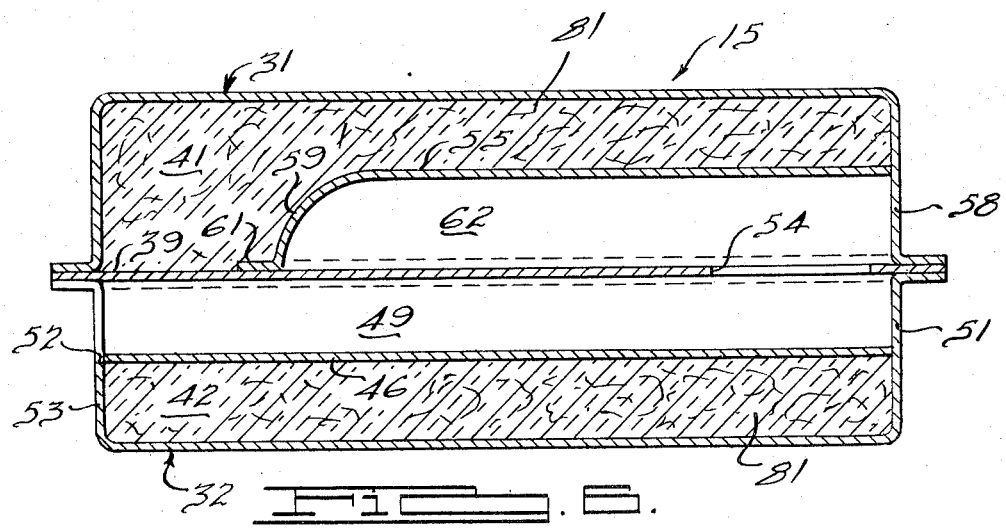

3,295,313
EXHAUST SYSTEM
Ervin C. Lentz, Jackson, Robert C. Bonner, Napoleon, and Robert N. Balluff, Rives Junction, Mich., assignors to Walker Manufacturing Company, a corporation of Delaware
Filed Aug. 12, 1965, Ser. No. 479,172
6 Claims. (Cl. 60—30)

This invention relates to an exhaust system for reducing the emission of smog producing exhaust gas constituents to the atmosphere from an internal combustion engine and more particularly to an improved device for adding secondary air to the engine to aid in the complete combustion of the fuel.

It has been found that certain of the smog producing exhaust gas constituents that are emitted to the atmosphere from an internal combustion engine can be reduced in quantity by means of further combustion or oxidation. The further combustion can be promoted through the introduction of secondary or excess air to a flow passage of the engine combustion system including its exhaust system. A simple venturi positioned in one of the flow passages offers a convenient means for introducing the supplemental air. The supplemental air is introduced at the low pressure areas formed at the throat of the venturi section. The amount of air inspirated through the venturi is roughly proportional to the engine speed since the amount of air entering and leaving the engine is dependent upon the engine speed. The secondary air requirements are, however, not directly related solely to engine speed. The venturi also can create excess back pressure at the higher engine speeds.

It is, therefore, an object of this invention to provide a mechanism including a simple venturi for introducing secondary air to an internal combustion engine to reduce the amount of smog producing exhaust gas components at all engine speeds.

It is a further object of this invention to provide a venturi device for introducing secondary air that also includes a simplified control for the amount of secondary air introduced.

It is a further object of this invention to provide a venturi device for introducing secondary air into an exhaust system of an internal combustion engine that provides means for bypassing the venturi at higher engine speeds.

It is a still further object of this invention to provide an improved and simplified venturi device for introducing secondary air into the exhaust system of an internal combustion engine.

A device for introducing secondary air into the exhaust system of an internal combustion engine for assisting in consuming unburned smog producing exhaust gas constituents embodying this invention comprises means defining parallel exhaust gas flow passages from the engine. One of the exhaust gas flow passages includes means defining a venturi section. Means are provided for introducing secondary air into the venturi section at its throat. Additional means are provided to divert the engine exhaust gas flow from the passage containing the venturi section to the other passage as the engine exhaust gas pressure increases to limit the amount of secondary air introduced through the venturi section and to reduce the exhaust system back pressure.

Other objects and advantages of this invention will become apparent as this description proceeds, particularly when considered in conjunction with the accompanying drawings, wherein:

FIGURE 1 is a partially schematic side elevational view of an internal combustion engine embodying this invention;

FIGURE 2 is an enlarged top plan view of the secondary air inspirating device embodying this invention and is taken generally in the direction of the arrow 2 in FIGURE 1;

FIGURE 3 is a cross-sectional view taken along the line 3—3 of FIGURE 2;

FIGURE 4 is a cross-sectional view taken along the line 4—4 of FIGURE 3;

FIGURE 5 is a cross-sectional view taken along the line 5—5 of FIGURE 2; and

FIGURE 6 is a cross-sectional view taken along the line 6—6 of FIGURE 2.

Referring now in detail to the drawings and in particular to FIGURE 1, an internal combustion engine of the automotive type is identified generally by the reference numeral 11. The engine 11 has an induction system 12 and an exhaust system comprised in part of an exhaust manifold 13. Affixed to the outlet end of the exhaust manifold 13 is an exhaust pipe 14 that extends to a secondary air inspirating device indicated generally by the reference numeral 15 and shown in more detail in the remaining figures. The outlet end of the inspirating device 15 is connected by means of a short pipe 16 to a catalyst converter 17, of any known type, that discharges exhaust gases to the atmosphere by means of a tailpipe 18. It is to be understood that although the secondary air inspirating device 15 is illustrated in conjunction with a catalytic converter 17, in some applications the use of the secondary air inspirating device 15 by itself may provide sufficient excess air to reduce the smog producing exhaust gas components to an acceptable level. In addition, the secondary air inspirating device may be used in other flow passages of the engine 11 than the exhaust system.

Referring now in detail to the remaining figures, the secondary air introducing device 15 is comprised of a tubular member 21 having a reduced diameter inlet bushing end 22 that is adapted to be connected to the outlet end of the exhaust pipe 14. The tubular member 21 defines a first exhaust gas passage 23. Supported within the tubular member 21 is a venturi device, indicated generally by the reference numeral 24, comprised of a tubular member defining a cylindrical section 25 and a divergent nozzle section 26. Press fitted or otherwise secured within the cylindrical section 25 is a corresponding cylindrical section 27 of a second member that terminates at a convergent nozzle 28. The outlet end of the convergent nozzle portion 28 is positioned adjacent the opening of the divergent section 27 and the two members form a throat 29 of the resultant venturi section. The venturi device 24 is in open communication at its inlet and outlet ends with the passage 23.

A housing comprised of upper and lower generally cup-shaped sheet metal members 31 and 32 encircles and encloses a major portion of the length of the tubular member 21. The cup-shaped members 31 and 32 are generally rectangular in plan view and have semi-circular edge portions 33 and 34 at one side that engage the tubular member 21 around a portion of its periphery and terminate in flange portions 35 and 36 that are secured together as by spot welding. The cup-shaped members 31 and 32 extend some distance away from the side of the tubular member 21 to form a secondary air inlet passage at the long side, as will become more apparent as this description proceeds.

At the one side of the tubular member 21, a generally flat sheet metal baffle 39 divides the remaining portion of the interior of the cup-shaped members 31 and 32 into upper and lower chambers 41 and 42. The baffle 39 is spot welded along its length between a pair of outwardly extending side flanges 43 and 44 of the cup-shaped members 31 and 32, respectively.

A first segmented tubular member 46, in the shape of a semi-cylinder, has a pair of outwardly extending flanges 47 and 48 that are spot welded along their length to the lower side of the baffle 39 (FIGURE 4). The segmented tubular member 46 extends the full length of the lower shelf 32 and defines a longitudinally extending air inlet passage 49 that is substantially coaxial with the exhaust gas passage 23. The passage 29 is closed at its rear end by an upstanding wall 51 of the cup-shaped member 31 (FIGURE 6). An air inlet opening 52 is formed in an opposite upstanding wall 53 of the cup-shape member 32 in alignment with the opposite end of the passage 49. Air may thus flow axially along the passage 49 from the inlet opening 52 to the wall 51.

An aperture 54 is formed in the baffle 39 contiguous to the wall 51 and in registry with the passage 49. A second segmented tubular sheet metal member 55, which is also in the shape of a half of cylinder along a portion of its length, has a pair of side flanges 56 and 57 that are affixed, as by spot welding, to the upper side of the baffle 39 and overlying the aperture 54. The end of the tubular member 55 adjacent the aperture 54 is closed by contact with a rear wall 58 of the upper cup-shaped member 31. The forward end of the segmented tubular member 55 is also closed by a downwardly extending portion 59 that terminates in a flange 61 which is spot welded to the baffle 39 (FIGURE 6). The segmented tubular member 55, thus, forms a second air passage 62 that is in open communication at one end with the aperture 54 and thus with the adjacent segmented tubular member 46 and passage 49.

The end of the passage 62 opposite to the aperture 54 is formed with a 90° bend by means of an integral sheet metal portions 63 (FIGURES 2 and 4) of the segmented tubular member 55. The portion 63 is formed with an annular bushing part 65 that extends toward the tubular member 21 and terminates adjacent it. A short tube 67 is fitted within the bushing part 65 and extends into the venturi 24 at the throat 29 through a secondary air inlet opening 68 (FIGURES 2 and 3). The section 67 may be formed integrally with the tubular member that forms the divergent portion 26 of the venturi section or may be a separate element that is connected to it.

It should be readily apparent that the flow of exhaust gas through the venturi 24 will create a decreased pressure at the throat 29. Atmospheric air may thus flow from the air inlet opening 52 through the first passage 49, aperture 54 and second passage 62 to the venturi throat through the opening 68. The secondary air thus will mix with the exhaust gases, the mixing being aided by the turbulence within the throat 29, to promote further reaction of the exhaust gases to reduce the quantity of certain smog producing components. The secondary air also assists in the operation of the catalytic converter 17.

The secondary air inspirating device 15 as thus far described will introduce an amount of secondary air that is dependent upon the exhaust gas pressure at the inlet end of the venturi 24 since the outlet pressure is substantially constant and atmospheric. The amount of secondary air inspirated will, therefore, increase roughly in direct proportion to an increase in the speed of the engine 11. It has been found, however, that the amount of secondary air required at higher engine speeds is not in proportion to that required at lower speeds. In fact, secondary air may be unnecessary with some engines at the higher speeds. The introduction of excess secondary air has a detrimental effect upon the catalytic converter 17 unless some temperature control is provided since the temperature of the catalyst also increases in relation to the amount of air inspirated. In addition, the venturi 24 increases the exhaust system back pressure unless bypassed.

A valve assembly, indicated generally by the reference numeral 71, is, therefore, provided to control the amount of air that flows through the venturi section 24. The valve assembly 71 comprises a generally cylindrical housing mmeber 72 that is affixed to the outlet end of the tubular member 21 by means of a supporting portion 73. The housing 72 is formed with a reduced diameter bushing portion 74 that is connected to the inlet end of the pipe 16.

The support member 73 is formed with a pair of journals 75 on opposite sides thereof (FIGURE 2) to pivotally support a control valve shaft 76. Affixed to the control valve shaft 76 is a valve member having a first portion 77 that is adapted to cooperate with the outlet side of the passage 23 to regulate the exhaust flow through the passage 23. A weight 78 is affixed in any suitable manner to the valve portion 77 so that the valve portion 77 will normally offer a flow restriction at the outlet side of the passage 23. The weight 78 is also adapted to register with the outlet end of the diffuser section 26 of the venturi 24 when the valve is open so that it will offer a flow restriction through this exhaust path.

FIGURE 3 illustrates the position of the valve 77 when the engine is at rest or idling. In this condition a substantial restriction to exhaust gas flow through the passage 23 is provided and substantially all of the engine exhaust gas will flow through the venturi 24. As the engine speed increases, the exhaust gas pressure will also increase due to the restriction of the venturi 24. As the exhaust gas pressure acting upon the valve portion 77 increases, the effect of the counter weight 78 will be overcome and the valve portion 77 and supporting shaft 76 will be pivoted about the journals 75. The amount of opening will, of course, depend upon the actual exhaust gas pressure. As the valve portion 77 opens, a portion of the exhaust gas flow will pass through the passage 23 rather than the venturi 24. The counter weight 78 will also obstruct the outlet end of the diffuser section 26 to shunt the air flow from the venturi 24 to the straight-through passage 23. The proportion of secondary air introduced at the venturi throat 29 will, therefore, decrease as the exhaust gas pressure increases. The amount of secondary air that is introduced will thus be limited at higher engine speeds.

To assist in silencing the volume of air flowing through the secondary air introducing device 15, the chambers 41 and 42 are packed with a sound deadening material such as glass fiber or the like as indicated by the reference numeral 81. The glass fiber 81 also serves to insulate the secondary air passages from the tube 21 which is heated by the exhaust gas flow and thus aids in maintaining an acceptable temperature within the catalyst container 17.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A device for introductory secondary aid into the exhaust system of an internal combustion engine for assisting in consuming unburned smog producing exhaust gas constitutents comprising means defining an exhaust gas flow passage from the engine, means defining a venturi section in said exhaust gas flow passage, a two-part housing, baffle means dividing said housing into two halves, means including said baffle means defining a first passage in one of said halves running substantially the length of said housing, said first passage having an inlet opening through said housing at one end thereof and being closed at its other end by said housing, means including said baffle means defining a second passage in other of said halves, an opening in said baffle means contiguous to said other end of said first passage and contiguous to one end of said second passage defining a flow path between said passages, and means providing a flow path between the other end of said second passage and the throat of said venturi section for introducing secondary air into said exhaust gas passage through said venturi section via said housing.

2. A device for introducing secondary air into the exhaust system of an internal combustion engine for assisting in consuming unburned smog producing exhaust gas constitutents comprising means defining parallel exhaust gas flow passages from the engine, one of said exhaust gas flow passages including means defining a venturi section, a two-part housing, baffle means dividing said housing into two halves, means including said baffle means defining a first air passage in one of said halves running substantially the length of said housing, said first air passage having an inlet opening through said housing at one end thereof and being closed at its other end by said housing, means including said baffle means defining a second air passage in the other half of said housing, an opening in said baffle means contiguous to said other end of said first air passage and contiguous to one end of said second air passage for defining a flow path between said air passages, means defining a flow path from the other end of said second air passage and the throat of said venturi section for introducing secondary air into said exhaust gas flow passage through said venturi section, and means for diverting the engine exhaust gas flow from said one exhaust gas flow passage to the other of said exhaust gas flow passages as the engine exhaust pressure increases to limit the amount of secondary air introduced through said venturi section.

3. A device for introducing secondary air into the exhaust system of an internal combustion engine for assistance in consuming unburned smog producing exhaust gas constituents comprising means defining a first exhaust gas passage from the engine, a second exhaust gas passage contained within said first exhaust gas passage and open at both ends thereto, means defining a venturi section in one of said exhaust gas passages, a two-part housing encircling a portion of the length of said first exhaust gas passage, a baffle means cooperating with said first exhaust gas passage to divide said housing into two halves, means defining a first air passage in one of said halves running substantially the length of said housing and being substantially parallel to the enclosed portion of said first exhaust gas passage, said first air passage having an inlet opening through said housing at one end thereof and being closed at its other end by said housing, means defining a second air passage in the other of said halves, an opening in said baffle contiguous to said other end of said first air passage and contiguous to one end of said second air passage for defining a flow path between said air passages, and means defining an air flow path between the other end of said second air passage and said venturi section at its throat for introducing secondary air into the exhaust system through said venturi section.

4. A device for introducing secondary air into the exhaust system of an internal combustion engine for assisting in consuming unburned smog producing exhaust gas constituents comprising means defining a first exhaust gas passage from the engine, a second exhaust gas passage contained within said first exhaust passage and open at both ends thereto, means defining a venturi section in one of said exhaust gas passages, two-part housing encircling a portion of the length of said first exhaust gas passage, baffle means cooperating with said first exhaust gas passage to divide said housing into two halves, means defining a first air passage in one of said halves running substantially the length of said housing and being substantially parallel to the enclosed portion of said first exhaust gas passage, said first air passage having an inlet opening through said housing at one end thereof and being closed at its other end by said housing, means defining a second air passage in the other of said halves, an opening in said baffle contiguous to said other end of said first air passage and contiguous to one end of said second air passage for defining a flow path between said air passages, means defining an air flow path between the other end of said second air passage and said venturi section at its throat for introducing secondary air into the exhaust system through said venturi section, and pressure responsive valve means for diverting the engine exhaust gas flow from said one exhaust gas flow passage to the said other exhaust gas passages as the engine exhaust gas pressure increases to limit the amount of secondary air introduced through said venturi section.

5. A device for introducing secondary air into the exhaust system of an internal combustion engine for assisting in consuming unburned smog producing exhaust gas constituents comprising means defining a first exhaust gas passage from the engine, a second exhaust gas passage contained within said first exhaust gas passage and open at both ends thereto, means defining a venturi section in one of said exhaust gas passages, two-part housing encircling a portion of the length of said first exhaust gas passage, baffle means cooperating with said first exhaust gas passage to divide said housing into two halves, means defining a first air passage in one of said halves running substantially the length of said housing and being substantially parallel to the enclosed portion of said first exhaust gas passage, said first air passage having an inlet opening through said housing at one end thereof and being closed at its other end by said housing, means defining a second air passage in the other of said halves, an opening in said baffle contiguous to said other end of said first air passage and contiguous to one end of said second air passage for defining a flow path between said air passages, means defining an air flow path between the other end of said second air passage and said venturi section at its throat for introducing secondary air into the exhaust system through said venturi section, a valve member, said valve member having a first portion thereof exposed to the downstream side of said other exhaust gas passage and normally restricting the flow through said other exhaust gas passage, means supporting said valve member for pivotal movement from said normal position to an open position wherein the restriction to flow through said other exhaust gas passage is diminished, and means on said valve member for restricting the flow through said one exhaust gas passage when in its opened position, said last named means offering substantially less restriction to flow when said valve member is in its normal position than when said valve member is in its opened position.

6. A device for introducing secondary air into the exhaust system of an internal combustion engine for assisting in consuming unburned smog producing exhaust gas constituents comprising means defining a first exhaust gas passage from the engine, a second exhaust gas passage contained within said first exhaust gas passage and open at both ends thereto, means defining a venturi section in said second exhaust gas passage, a two-part housing comprised of a pair of facing cup-shaped shells encircling at least a portion of the length of said first exhaust gas passage, a baffle interposed at least in part between said shells throughout their length, a first segmented tubular member fixed to one side of said baffle and extending throughout the length of one of said shells in a substantially parallel direction with respect to said first exhaust gas passage, one end of said shell having an inlet opening in registry with one end of said first segmented tubular member, the opposite end of said one shell forming a closure for the opposite end of said first segmented tubular member, an aperture in said baffle in registry with said other end of said first segmented tubular member, a second segmented tubular member affixed to the other side of said baffle, one end of said second segmented tubular member being in sealing engagement with a respective end of said shells to form a closure for said one end, said one end being in communication with said aperture in said baffle, means providing a flow passage between the other end of said segmented tubular member and said venturi section at its throat for introducing secondary air to said exhaust gas passages through said venturi section, a valve member, said valve member having a first portion thereof exposed to the downstream side of said first exhaust gas passage and normally restricting the flow through said first exhaust gas passage, means supporting said valve member within said first exhaust gas passage for pivotal movement from said normal position to an open position wherein the restriction to flow through said first exhaust gas passage is diminished, and means on said valve member for restricting the flow through said second exhaust gas passage when in its opened position, said last named means offering substantially less restriction of flow when said valve member is in its normal position than when in its open position.

References Cited by the Examiner
UNITED STATES PATENTS

| | | | |
|---|---|---|---|
| 2,795,103 | 6/1957 | Jenison | 60—30 |
| 2,851,852 | 9/1958 | Cornelius | 60—30 |
| 3,083,525 | 4/1963 | Morris | 60—30 |
| 3,197,287 | 7/1965 | Innes | 60—30 X |
| 3,201,207 | 8/1965 | Lentz | 60—30 X |

MARK NEWMAN, *Primary Examiner.*

RALPH D. BLAKESLEE, *Assistant Examiner.*